United States Patent Office 3,392,180
Patented July 9, 1968

3,392,180
CATALYTIC PROCESS FOR REACTIONS OF
ALKYL ALUMINUM COMPOUNDS
Lyle A. Hamilton, Pitman, N.J., assignor to Mobil Oil
Corporation, a corporation of New York
No Drawing. Filed July 12, 1965, Ser. No. 471,476
15 Claims. (Cl. 260—429.9)

ABSTRACT OF THE DISCLOSURE

An alkyl aluminum compound having the formula $AlR_2R'$ where each R is a saturated hydrocarbon radical and R' is a saturated hydrocarbon radical, hydrogen or halogen, is reacted with a member from the group of aluminum hydride, another alkyl aluminum compound, an aluminum alkoxide having the formula $Al(OR)_3$ where R has the above meaning, or a halide of an element of Groups II to V of the Periodic Table, under reaction conditions in the presence of a crystalline aluminosilicate catalyst.

---

The present invention relates to reactions of alkyl aluminum compounds, and more particularly to catalytic processes for effecting exchange reactions of alkyl aluminum compounds in the presence of crystalline aluminosilicate catalysts.

One of the objects of the present invention is to provide a procedure for reacting alkyl aluminum compounds with various inorganic compounds to introduce organic radicals into such inorganic compounds. Heretofore, the introduction of organic radicals into inorganic compounds has been attempted in various ways. These processes, however, have suffered from one or more drawbacks which have limited their industrial utility, such as the necessity to use reagents which are difficult to obtain, poor yields, handling problems, and the like.

In accordance with the broad aspect of the invention, organic compounds of the elements of Groups II to V of the Periodic Table of Mendeleev are produced by effecting exchange reactions of alkyl aluminum compounds with compounds of said elements which are essentially nonionic in character, in the presence of a crystalline aluminosilicate catalyst. One preferred class of said compounds includes those compounds that are liquid at the reaction conditions. Another preferred class of said compounds includes the halides of the elements of Groups II to V of the Periodic Table, and more preferably halides of elements having atomic numbers between 12 and 51. Suitable halides of Groups II to V are the halides of zinc, magnesium, tin, lead, silicon, titanium, and phosphorous. Examples of such halides are $ZnCl_2$, $MgBr_2$, $SnI_4$, $PbBr_4$, $SiCl_4$, $TiCl_4$, and $PCl_3$.

The alkyl aluminum compounds which are reacted with the above-mentioned compounds are preferably trialkyl aluminum compounds of the general formula $AlR_3$ wherein R is an alkyl radical preferably containing 1 to 18 carbon atoms, such as methyl, ethyl, propyl, butyl, and the like. Usually each R will be the same alkyl radical. Such alkyl aluminum compounds include aluminum trimethyl, aluminum triethyl, aluminum tripropyl, and aluminum triundecyl. The preferred alkyl aluminum compound is aluminum triethyl.

Typical reactions which may be catalyzed by crystalline aluminosilicates are represented by the following equations:

(1) $AlEt_3 + AlCl_3 \rightarrow AlEt_2Cl + AlEtCl_2$
(2) $AlEt_3 + AlH_3 \rightarrow AlEt_2H + AlEtH_2$
(3) $AlEt_3 + Al(C_8H_{17})_3 \rightarrow AlEt_2C_8H_{17} + AlEt(C_8H_{17})_2$
(4) $AlEt_3 + ZnCl_2 \rightarrow AlEt_2Cl + ZnEtCl$
(5) $AlEt_3 + MgBr_2 \rightarrow AlEt_2Br + MgEtBr$
(6) $AlEt_3 + Al(OCH_3)_3 \rightarrow AlEt_2OCH_3 + AlEt(OCH_3)_2$
(7) $4AlEt_3 + 3SnI_4 \rightarrow 4AlI_3 + 3SnEt_4$
(8) $4AlEt_3 + 3PbBr_4 \rightarrow 4AlBr_3 + 3Pb(Et)_4$
(9) $4AlEt_3 + 3SiCl_4 \rightarrow 4AlCl_3 + 3SiEt_4$
(10) $Al(C_4H_9)_3 + PCl_3 \rightarrow AlCl_3 + P(C_4H_9)_3$ In the above equations, Et represents an ethyl radical.

The above typical reactions have been written as if each reaction produced only two products. Equations 1 to 6 represent reactions in which only one of the alkyl groups has been replaced, and Equations 7 to 10 represent overall reactions in which all three of the alkyl groups have been replaced. In practice, a number of products will usually be produced. For example, referring to Equation 1 above, the diethyl aluminum chloride product may react with additional aluminum trichloride according to the equation: $AlEt_2Cl + AlCl_3 \rightarrow 2AlEtCl_2$. It is usually not possible to preclude such additional reactions; however, by proper regulation of the reaction conditions, good yields of the desired product may be obtained. Similarly, with reference to Equations 7 to 10, it will be appreciated that, in addition to the products shown, various intermediate compounds are produced. The equilibriums reached determine what product will predominate. It is apparent that the product mixture may be fractionated, and the reactants may be recycled for reuse.

The present invention includes such processes as the reaction of an alkyl aluminum compound having the general formula $AlR_2R'$, in which each R is a saturated hydrocarbon radical preferably having from 1 to 18 carbon atoms, and R' is a saturated hydrocarbon radical preferably having from 1 to 18 carbon atoms, hydrogen, or halogen; with a compound selected from the group consisting of aluminum hydride, another alkyl aluminum compound, aluminum alkoxides (e.g., $Al(OR)_3$ where R has the above meaning), and halides having the general formula $MX_n$ wherein M is a metal of Groups II to V of the Periodic Table, X is halogen, and $n$ is an integer corresponding to the valence of M. The term halogen is meant to include chlorine, bromine and iodine.

The reaction conditions may vary over a wide range depending upon the reactants employed and the activity of the aluminosilicate catalysts. The reaction may be conveniently conducted at a temperature between about 25° C. and the decomposition temperature of the particular alkyl aluminum employed as the starting material. Since the alkyl aluminum compound is relatively unstable, its decomposition temperature usually imposes the upper temperature limit upon the reaction. Most of the alkyl aluminum compounds are relatively stable at temperatures up to about 200° C. If the reaction is conducted at a temperature below about 25° C., it is difficult to drive the reaction to completion. The reaction temperature is preferably between 25° to 150° C.

The reaction is conveniently conducted at substantially atmospheric pressure although the reaction pressure may vary considerably, for example, between about 10 and about 1000 p.s.i.g. depending upon the reactants employed. Preferably, the pressure will be between about atmospheric to 500 p.s.i.g.

When the reactants are liquids, the reaction is preferably carried out in the absence of solvents, otherwise it is preferable to employ a suitable organic solvent as a reaction medium for the process. The solvent selected must be one that does not chemically combine or react with either the reactants or the products. The solvent chosen for a particular reaction should be one having a boiling point substantially different from that of the desired products to facilitate product recovery. Such solvents include aliphatic hydrocarbons such as pentanes, hexanes, heptanes, and the like, and known aromatic solvents such as benzene, xylene, and the like. In general, an excess of the alkyl aluminum compound is slowly added to a mixture of the inorganic compound and catalyst in a solvent, if any.

In their hydrated form, the aluminosilicates may be represented by the formula:

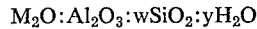

$$M_2O:Al_2O_3:wSiO_2:yH_2O$$

wherein M is a cation which balances the electrovalence of the tetrahedra, $n$ represents the valance of the cation, $w$ the moles of $SiO_2$, and $y$ the moles of $H_2O$, the removal of which produces the characteristic open network system. The cation may be hydrogen or any one or more of a number of metal ions depending upon whether the aluminosilicate is synthesized or occurs naturally. Typical cations include sodium, lithium, potassium, silver, magnesium, zinc, barium, iron, manganese, calcium, rare earths, cobalt, nickel, chromium, etc. The parent zeolite, if not received in dehydrated form commercially, is dehydrated to actuate it for use as a catalyst. Although the proportions of inorganic oxides in the silicates and their spatial arrangement may vary, effecting distinct properties in the aluminosilicates, the two main characteristics of these materials is the presence in their molecular structure of at least 0.01 equivalents and preferably more than 0.1 equivalents of a hydrogen or metal ion per gram atom of aluminum and an ability to undergo dehydration without substantially affecting the $SiO_4$ and $AlO_4$ framework.

Numerous synthesized aluminosilicates having varying type structures have been disclosed in the prior art, and these aluminosilicates have been designated by their structure, as for example, Zeolite X, Y, L, D, R, S, T, Q and B. For a further description of zeolites of the type usable in the present invention reference is made to U.S. Patents 2,971,824, 2,882,244, 3,013,989 and 3,033,778.

A preferred group of aluminosilicates for use in this invention are large pore size natural and synthetic faujasites. By the term "synthetic faujasite" is meant those synthetic aluminosilicates having a structure and properties extremely similar to naturally occurring faujasite. For purposes of this description and appendant claims, the term "faujasite" is intended to include naturally occurring faujasite and synthetic faujasite. Typical of the synthetic faujasites are Zeolite X and Y.

Among the naturally occurring crystalline aluminosilicates which can be employed for purposes of the invention are included faujasite, heulandite, clinoptilolite, dachiardite and aluminosilicates represented as follows wherein metal cations other than those shown may be present.

Chabazite—$Na_2O.Al_2O_3.4SiO_2.6H_2O$
Gmelinite—$Na_2O.Al_2O_3.4SiO_2.6H_2O$
Mordenite—$Na_8(AlO_2)_8(SiO_2)_{40}24H_2O$ Another preferred naturally occurring crystalline aluminosilicate is erionite described originally by Eakle, Am. J. Science (4), 6, 66 (1898).

The non-sodium forms of the metal-containing aluminosilicates may be suitably prepared from the sodium forms thereof by a conventional replacement technique, involving the contacting of the crystalline sodium aluminosilicate zeolite with a solution of an ionizable compound of the ion which is to be exchanged into the molecular sieve structure for a sufficient time to bring about the extent of desired introduction of such ion. Repeated use of fresh solutions of the entering ion is of value to secure more complete exchange. After such treatment, the resulting exchanged product is water-washed, dried and dehydrated.

In preparing the non-sodium forms of the catalyst composition, the aluminosiliacte can be contacted with a non-aqueous or aqueous fluid medium comprising a gas, polar solvent or water solution containing the desired metallic salt soluble in the fluid medium. Introduction of hydrogen ions is suitably effected by contact of the aluminosilicate with an ammonia-containing medium, such as an ammonium salt solution, e.g., ammonium chloride, which serves to exchange into the aluminosilicate ammonium ions which upon subsequent heating are converted to hydrogen ions. The aluminosilicates of high silica content, such as for example Zeolite Y whose formula expressed in terms of mole oxides may be written as: $0.9\pm0.2Na_2O:Al_2O_3:wSiO_2:xH_2O$ wherein $w$ is from 3 up to about 6 and $x$ may be a value up to about 9 may be treated directly without adverse affect with an acid, e.g., hydrochloric acid, sulfuric acid, acetic acid, propionic acid, crotonic acid, and the like. Acidic Zeolite Y is a preferred catalyst in reactions involving $AlCl_3$ and other inorganic compounds of similar characteristics. Water is the preferred medium for reasons of economy and ease of preparation in large scale operations involving continuous or batchwise treatment. Similarly, for this reason, organic solvents are less preferred, but can be employed providing the solvent permits ionization of the metallic salt. Typical solvents include cyclic and acyclic ethers such as dioxane, tetrahydrofuran, ethyl ether, diethyl ether, diisopropyl ether, and the like; ketones such as acetone and methyl ethyl ketone, esters such as ethyl acetate, propyl acetate; alcohols such as ethanol, propanol, butanol, etc.; and miscellaneous solvents such as dimethylformamide and the like.

The metal cation may be present in the fluid medium in an amount varying within wide limits dependent upon the pH value of the fluid medium. Where the aluminosilicate material has a molar ratio of silica to alumina greater than about 5.0, the fluid medium may contain a metal cation equivalent to a pH value ranging from less than 4.0 up to a pH value of about 10.0, preferably between 4.5 and 8.5. Where the silica:alumina molar ratio is greater than about 2.2 and less than about 5.0, the pH value for the fluid media containing a metal cation ranges from 3.8 to 8.5. Thus, depending upon the silica to alumina ratio, the pH value varies within rather wide limits.

In carrying out the treatment with the fluid medium the procedure employed comprises contacting the aluminosilicate with the desired fluid medium or media until such time as metallic cations originally present in the aluminosilicate are exhausted to the desired degree and replaced by hydrogen and/or other metal ions. Effective treatment with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 5 and 8 and air dried. The aluminosilicate material is thereafter analyzed for cation content by methods well known in the art. Analysis also involves analyzing the effluent wash for anions contained in the wash as a result of the treatment, as well as determination of and correction for anions that pass into the effluent wash from soluble substances or decomposition products of insoluble substances which are otherwise present in the aluminosilicate as impurities.

The actual procedure employed for carrying out the fluid treatment of the aluminosilicate may be accomplished in a batch-wise or continuous method under atmospheric, subatmospheric or superatmospheric pressure. A solution of the ions of positive valence in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogenous pressure. Similarly, treatments involving fusion or vapor phase contact may be employed.

A wide variety of metallic compounds can be employed with facility as a source of metallic cations and include both inorganic and organic salts of the metals of Group IB through Group VIII of the Periodic Table.

Representative of the salts which can be employed include chlorides, bromides, iodides, carbonates, bicarbonates, sulfates, sulfides, thiocyanates, dithiocyanates, dithiocarbamates, peroxysulfates, acetates, benzoates, citrates, fluorides, nitrates, nitrites, formates, propionates, butyrates, valerates, lactates, malonates, oxalates, palmiates, hydroxides, tartrates and the like. The only limitation on the particular metal salt or salts employed is that it be soluble in the fluid medium in which it is used. The preferred salts are the chlorides, nitrates, acetates and sulfates.

Of the wide variety of metallic salts which can be employed, there may be mentioned salts of trivalent metals, divalent metals and monovalent metals. Of the divalent metals, some preferred ones are the alkaline earth metals, particularly calcium. Such alkaline metal substituted aluminosilicates are of particular usefulness when the alkyl aluminum compound is to be reacted with aluminum alkoxides or another alkyl aluminum compound. Other preferred salts which may be used for cation-exchange are those of the rare metals including cerium, lanthanum, citrates, fluorides, nitrates, nitrites, formates, propionates, praseodymium, neodymium illinium, samorium, europium, gadolinium, terbium, dysprosium, holmium, erbium, thulium, yttrium, and lutecium.

The rare-earth salts employed can either be the salt of a single metal or, preferably, of mixtures of metals such as a rare-earth chloride or didymium chlorides. As hereinafter referred to, a rare-earth chloride solution is a mixture of rare-earth chlorides consisting essentially of the chlorides of lanthanum, cerium, neodymium and praseodymium with minor amounts of samarium, gadolinium and yttrium. The rare-earth chloride solution is commercially available and it contains the chlorides of a rare-earth mixture having the relative composition: cerium (as $CeO_2$) 48 percent by weight; lanthanum (as $La_2O_3$) 24 percent by weight; praseodymium (as $Pr_6O_{11}$) 5 percent by weight; neodymium (as $Nd_2O_3$) 17 percent by weight; samarium (as $Sm_2O_3$) 3 percent by weight; gadolinium (as $Gd_2O_3$) 2 percent by weight; yttrium (as $Y_2O_3$) 0.2 percent by weight; and other rare-earth oxides 0.8 percent by weight. Didymium chloride is also a mixture of rare-earth chlorides, but having a low cerium content. It consists of the following rare-earths determined as oxides: lanthanum 45–46 percent by weight; cerium 1–2 percent by weight; praseodymium 9–10 percent by weight; neodymium 32–33 percent by weight; samarium 5–6 percent by weight; dadolinium 3–4 percent by weight; yttrium 0.4 percent by weight; other rare-earths 1–2 percent by weight. It is to be understood that other mixtures of rare-earths are equally applicable in the instant invention.

Representative metal salts which can be employed, aside from the chlorides mentioned above, include silver chloride, silver sulfate, silver nitrate, silver acetate, silver arsenate, silver bromide, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, manganese chloride, manganese bromide, manganese sulfate, manganese nitrate, magnesium chloride, magnesium bromide, magnesium sulfate, magnesium sulfide, magnesium acetate, magnesium formate, magnesium stearate, magnesium tartrate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous iodide, cerous sulfate, cerous sulfide, lanthanum bromide, lanthanum nitrate, lanthanum sulfate, lanthanum sulfide, yttrium bromate, yttrium bromide, yttrium nitrate, yttrium sulfate, samarium acetate, samarium bromide, samarium sulfate, neodymium oxide, neodymium sulfide, neodymium sulfate, praseodymium bromide, praseodymium sulfate, praseodymium sulfide, etc.

The catalyst may be used in powdered, granular or molded state formed into spheres or pellets of finely divided particles having a particle size of 2 to 500 mesh. In cases where the catalyst is molded, such as by extrusion, the alumino-silicate may be extruded before drying, or dried, or partially dried and then extruded. The catalyst product is then preferably calcined and treated with a trialkyl aluminum compound to remove final traces of water.

The catalysts just described may be used as such or distributed in a predetermined amount of an inert and/or catalytically active material which serves as a base, support, carrier, binder, matrix or promoter for the aluminosilicate. A preferred catalyst form is an aluminosilicate dispersed in a dried inorganic oxide amorphous gel, e.g., silica-alumina. The siliceous gel-aluminosilicate product may be prepared in any desired physical form. Generally spherical beads may be prepared by dispersing the aluminosilicate in an inorganic oxide sol by procedures well known in the art and converting to a gelled bead according to the method described in U.S. Patent No. 2,384,946.

In order to further illustrate the present invention, the following examples are offered. These examples are to be considered as illustrative of various embodiments of the invention and not as limiting the invention. All parts indicated are parts by weight unless otherwise specified.

Example I

Five cubic centimeters of Zeolite Y having a particle size of about 5 microns was subjected to three treatments at 100° F. with 10 ml. of a 25% by weight aqueous solution of ammonium chloride for periods of 4, 24 and 28 hours respectively. The ammonium chloride solution was decanted and the aluminosilicate was washed with water, dried over night, and then calcined for 15 minutes in air at 1000° F.

One mol of aluminum trichloride and acidic zeolite Y prepared as above were placed in a reaction vessel containing 500 ml. of dry hexane and a stirrer. Two mols of aluminum triethyl were added slowly to the reaction vessel while stirring the reaction mixture. The temperature in the vessel was maintained at 60°–70° C. during the addition and until equilibrium was reached. The product was an equilibrium mixture in which aluminum diethyl chloride and aluminum ethyl dichloride were present in good yield.

Example II

The procedure of Example I was repeated except that, in lieu of the catalyst of Example I, there was employed an acidic form of erionite prepared by treating erionite (sodium salt) with an aqueous solution of hydrochloric acid until the effluent contained substantially no metallic cations. The acidic catalyst so prepared was washed, dried and calcined before use.

At the completion of the exchange reaction, the product was an equilibrium mixture in which aluminum diethyl chloride and aluminum ethyl dichloride predominated.

Example III

An alkaline earth metal aluminosilicate was prepared by base exchanging zeolite Y with calcium chloride to produce the calcium form of zeolite Y. The catalyst thus prepared and one mol of $Al(C_8H_{17})_3$ were placed in a reaction vessel to which there was added slowly with stirring an excess of aluminum triethyl. The temperature in the vessel was maintained at 60°–70° C. during the addition until equilibrium was reached. After equilibrium, the products were primarily $AlEt_2C_8H_{17}$ and $AlEt(C_8H_{17})_2$ in good yield.

Example IV

Calcium zeolite Y and one mol of $PCl_3$ were placed in a reaction vessel. An excess of $Al(C_4H_9)_3$ was added slowly while stirring, with the temperature maintained at 50°–60° C. until equilibrium was reached. The product was a mixture in which $P(C_4H_9)_3$ was present in good yield.

What is claimed is:

1. A process comprising reacting an alkyl aluminum compound having the formula $AlR_2R'$, in which each R is a saturated hydrocarbon radical, and R' is a member selected from the group consisting of a saturated hydrocarbon radical, hydrogen, and halogen; with a member selected from the group consisting of aluminum hydride, another alkyl aluminum compound, an aluminum alkoxide having the formula $Al(OR)_3$ wherein R has the above meaning, and a halide having the formula $MX_n$ wherein M is an element of Groups II to V of the Periodic Table, X is halogen, and $n$ is an integer corresponding to the valence of M; under reaction conditions in the presence of a crystalline aluminosilicate catalyst.

2. A process according to claim 1, wherein said compound is a liquid at the reaction conditions.

3. A process according to claim 1, wherein the reaction temperature is between about 25° to 150° C.

4. A process according to claim 1, wherein the reaction pressure is between about atmospheric pressure to 500 p.s.i.g.

5. A process according to claim 1, wherein the catalyst is an acidic faujasite.

6. A process according to claim 1, wherein the catalyst is an alkaline earth metal aluminosilicate.

7. A process according to claim 1, wherein the catalyst is dispersed in an inorganic oxide matrix.

8. A process according to claim 1, wherein the alkyl aluminum compound having the formula $AlR_2R'$ is aluminum triethyl.

9. A process according to claim 1, wherein said member is an aluminum alkoxide.

10. A process according to claim 1, wherein said member is a halide having the formula $MX_n$.

11. A process comprising reacting an alkyl aluminum compound having the formula $AlR_2R'$ in which R is a saturated hydrocarbon radical and R' is a member selected from the group consisting of a saturated hydrocarbon radical, hydrogen, and halogen; with aluminum trichloride under reaction conditions in an inert solvent in the presence of an acid faujasite catalyst.

12. A process comprising effecting an exchange reaction between two different alkyl aluminum compounds each having the formula $AlR_2R'$ in which R is a saturated hydrocarbon radical, and R' is a member selected from the group consisting of a saturated hydrocarbon radical, hydrogen and halogen; under reaction conditions in the presence of an alkaline earth metal crystalline aluminosilicate catalyst.

13. A process comprising reacting aluminum triethyl with aluminum hydride under reaction conditions in an inert solvent in the presence of a crystalline aluminosilicate catalyst.

14. A process comprising reacting aluminum triethyl with zinc dichloride under reaction conditions in an inert solvent in the presence of a crystalline aluminosilicate catalyst.

15. A process comprising reacting aluminum triethyl with phosphorous trichloride under reaction conditions in the presence of a crystalline aluminosilicate catalyst.

References Cited

UNITED STATES PATENTS

| | | | |
|---|---|---|---|
| 2,384,946 | 9/1945 | Marisic. | |
| 2,571,987 | 10/1951 | McDyer et al. | 260—437 |
| 2,859,228 | 11/1958 | Blitzer et al. | 260—437 |
| 2,900,402 | 8/1959 | Johnson | 260—448 A |
| 2,971,903 | 2/1961 | Kimberlin et al. | 208—119 |
| 3,007,955 | 11/1961 | Blitzer et al. | 260—437 |
| 3,027,393 | 3/1962 | Jenkner et al. | 260—429.7 |
| 3,033,778 | 5/1962 | Frilette | 208—120 |
| 3,124,604 | 3/1964 | Hüther | 260—448 XR |
| 3,231,511 | 1/1966 | Classon | 260—437 XR |
| 3,281,443 | 10/1966 | Hunt. | |

FOREIGN PATENTS

| | | |
|---|---|---|
| 243,382 | 2/1963 | Australia. |
| 580,133 | 7/1959 | Canada. |

OTHER REFERENCES

Cotton, Progress in Inorganic Chemistry, John Wiley & Sons, Inc., N.Y. (1963), pp. 89–90 (copy in Gr. 112 QD–151–P7–C.2).

Chemical Reviews, vol. 61, p. 22 (1961), (copy in Gr. 112).

TOBIAS E. LEVOW, *Primary Examiner.*

H. M. S. SNEED, *Assistant Examiner.*